(12) United States Patent
Sun

(10) Patent No.: US 8,919,111 B2
(45) Date of Patent: Dec. 30, 2014

(54) DEVICE FOR OBTAINING INTERNAL ENERGY FROM LIQUID BY UTILIZING BUOYANCY AND METHOD THEREFOR

(76) Inventor: Rongjun Sun, Xuzhou (CN)

( * ) Notice: Subject to any disclaimer, the term of this patent is extended or adjusted under 35 U.S.C. 154(b) by 255 days.

(21) Appl. No.: 13/808,583

(22) PCT Filed: Apr. 2, 2011

(86) PCT No.: PCT/CN2011/000577
§ 371 (c)(1),
(2), (4) Date: Jan. 6, 2013

(87) PCT Pub. No.: WO2012/003707
PCT Pub. Date: Jan. 12, 2012

(65) Prior Publication Data
US 2013/0104536 A1    May 2, 2013

(30) Foreign Application Priority Data
Jul. 6, 2010    (CN) .......................... 2010 1 0222895

(51) Int. Cl.
| F16D 31/02 | (2006.01) |
| F03C 1/00 | (2006.01) |
| F03B 17/02 | (2006.01) |
| F03B 17/04 | (2006.01) |

(52) U.S. Cl.
CPC ................. *F03B 17/02* (2013.01); *F03B 17/04* (2013.01); *Y02E 10/20* (2013.01)
USPC ............................................... 60/398; 60/495

(58) Field of Classification Search
USPC .......................... 60/398, 495–507; 290/42, 53
See application file for complete search history.

(56) References Cited

U.S. PATENT DOCUMENTS

| 4,266,402 A | * | 5/1981 | Pruett .............................. 60/496 |
| 4,380,151 A | * | 4/1983 | Miller ............................. 60/496 |
| 4,718,232 A | * | 1/1988 | Willmouth ...................... 60/495 |
| 8,833,070 B2 | * | 9/2014 | Wilson et al. ................... 60/496 |
| 2010/0146961 A1 | * | 6/2010 | Silva .............................. 60/495 |

FOREIGN PATENT DOCUMENTS

| CA | 2437599 | 2/2005 |
| DE | 19623045 | 12/1997 |
| DE | 19730252 | 1/1999 |

* cited by examiner

*Primary Examiner* — Hoang Nguyen

(57) ABSTRACT

A device for obtaining internal energy from liquid by utilizing buoyancy includes: an inner body (2); a sealing strip (3); a shell body (5); an axle (1) and liquid, wherein the sealing strip (3) is mounted between the shell body (5) and the inner body (2), a liquid entrance (6) is provided at a bottom portion of the shell body (5), the inner body (2) is connected to the axle (1), an energy transformer is connected to the axle (1) or the shell body (5). Internal energy not used in the liquid is transformed into mechanical energy by a combination of the liquid, the inner body (2) and the axle (1). The present invention also provides a method for obtaining internal energy from liquid by utilizing buoyancy.

7 Claims, 3 Drawing Sheets

DEVICE FOR OBTAINING INTERNAL ENERGY FROM LIQUID BY UTILIZING BUOYANCY AND METHOD THEREFOR

CROSS REFERENCE OF RELATED APPLICATION

This is a U.S. National Stage under 35 U.S.C 371 of the International Application PCT/CN2011/000577, filed Apr. 2, 2011, which claims priority under 35 U.S.C. 119(a-d) to CN 201010222895.5, filed Jul. 6, 2010.

BACKGROUND OF THE PRESENT INVENTION

1. Field of Invention

The present invention relates to a device for obtaining internal energy from liquid by utilizing buoyancy and method thereof, and more particularly to a device for obtaining internal energy from liquid which utilizes buoyancy and features of doing work and method thereof.

2. Description of Related Arts

As we all know, an immersed object has a feature called 'weightlessness'. When an object moves up and down in water, it does no work to the outer system. This means that the total amount of energy in this system remains constant in such progress. Water displaced by this object will move up and down relatively and its potential energy is changing at the same time, which means the change of internal energy of the water. And the movement of the object is presented in extra energy form without doing work to the outer system, wherein the extra energy is not involved in the total amount of energy which remains constant. This is some kind similar to the electronics' energy exchange between kinetic energy and potential energy. The energy of the object moving up and down remains constant while the potential energy of the water displaced by this object changes continuously, which is defined by Bernoulli's equation. Similarly, when the position of the object is changing, the force on the object changes as well as the internal energy of the object. All these intimate the existence of extra energy in an internal energy form.

There is no practical way to make use of this extra energy in an internal energy form in the water now.

SUMMARY OF THE PRESENT INVENTION

An object of the present invention is to provide a practical method for obtaining internal energy from liquid by utilizing buoyancy and features of doing work, and transforming the internal energy into mechanical energy and a device therefor.

Accordingly, in order to accomplish the above objects, the present invention provides a device for obtaining energy, comprising: an inner body; a sealing strip; a shell body; an axle and liquid, wherein a first side of the sealing strip is integrated with the shell body, a second side of the sealing strip couples with the inner body and is capable of moving respectively, a liquid entrance is provided at a bottom portion the shell body, the inner body is connected to the axle, an energy transformer is connected to the axle or the shell body.

The inner body is embodied as a ¼ cylinder barrel connected to the axle at a center thereof.

The shell body is embodied as a ½ cylinder barrel, a cube barrel or a cuboid barrel, the sealing strip is connected to a position dividing the shell body into equal halves, a first half of the shell body is embodied as a sealed liquid room, a second half of the shell body is embodied as a gas communicating room, a liquid entrance is provided respectively at a bottom portion of the sealed liquid room and the gas communicating room.

The energy transformer is embodied as a device capable of storing the mechanical energy produced by the inner body and outputting the mechanical energy in mechanical energy form, the energy transformer can be a generator, an energy storing cylinder, a lifting pump or a spring mechanism.

The present invention also provides a method of obtaining energy, comprising steps of:

a) disposing the inner body inside the shell body and to a first side of the sealed liquid room of the shell body, wherein the inner body is sealed by the sealing strip, a density of the liquid equals to a density of the inner body, a second side of the shell body, which is the gas communicating room, communicates with atmosphere;

b) inputting the liquid having a pressure P into the sealed liquid room of the shell body through the liquid entrance, wherein the liquid puts a horizontal force F on the inner body, the inner body is driven to rotate towards the gas communication room of the shell body by the horizontal force F of the liquid, a weight of the inner body does a work Wg under gravity after being free from buoyancy of the liquid, which means that the work is done in a rotation form in a gravity field, the axle spins with the inner body, a work doing progress is finished after the inner body rotates from the sealed liquid room to the gas communicating room, wherein a work Wp done by the inner body to an outer system and the work Wg is inputted into the energy transformer;

c) releasing the liquid in the sealed liquid room via the liquid entrance after the liquid finishes doing work to the inner body, wherein energy Wl is obtained when the liquid is released, and the sealed liquid room changes into a new gas communicating room, the energy Wp is fed back through the energy transformer to the liquid released for obtain energy Wl+Wp=W to restore energy of the liquid, an energy loss of the liquid is paid back by the energy Wp, the energy of the liquid remains constant; and d) closing the sealed liquid room for forming the new gas communicating room and opening the gas communicating room for forming a new sealed liquid room, inputting the liquid, which has restored the energy, into the new sealed liquid room for doing work to the inner body in the sealed liquid room, wherein the inner body rotates by gravity after returning into the gravity field and obtains another energy Wg again, repeating steps above again and circularly, wherein: P refers to pressure; Wg refers to energy produced by the weight of the inner body; Wp refers to energy produced by the liquid driving the inner body; Wl refers to energy produced by releasing the liquid.

Therefore, the beneficial effect is that, with the foregoing structure and method, extra energy is obtained by analyzing a change of internal energy in liquid with an object, i.e., the inner body, floating in the liquid; taking advantage of a feature that gravity is a vertically downward conservative force, buoyancy is a vertically upward conservative and thus the inner body suffers a weightlessness by means of the gravity and the buoyancy; a phenomenon that the inner body does no work to an outer system and potential energy of the liquid displaced by the inner body changes; a method for transmitting mechanical energy easily by transforming the inner body into a liquid form in such a manner that energy can be transformed between different forms and transforming the liquid displaced by the inner body into a solid form, i.e., the inner body; and rotating the inner body from a weightlessness state to the gravity field. Energy can be obtained continuously and transmitted to be utilized in mechanical energy form by rotating the inner body from a weightlessness state to the gravity field. Objects of the present invention are accomplished by transforming the internal energy in the liquid to the mechanical energy and taking advantage of the mechanical energy.

The advantages of the present invention are that the inner body is driven by the buoyancy as well as the horizontal force; keeping the inner body being driven from the liquid to the gas communicating room transforms the internal energy not used in the liquid to mechanical energy by a combination of the liquid, the inner body and the axle. The present invention takes advantage of a new energy ignored as well as makes it convenient by linking with prior technology successfully.

These and other objectives, features, and advantages of the present invention will become apparent from the following detailed description, the accompanying drawings, and the appended claims.

Reference numbers of elements: 1-axle, 2-inner body, 3-sealing strip, 4-air releasing tube, 5-shell body, 6-liquid entrance, 7-bearing holder, 8-supporter, 9-valve, 10-floating body, 11-floating barrel, 12-communicating tube.

DETAILED DESCRIPTION OF THE PREFERRED EMBODIMENT

Figure 1:
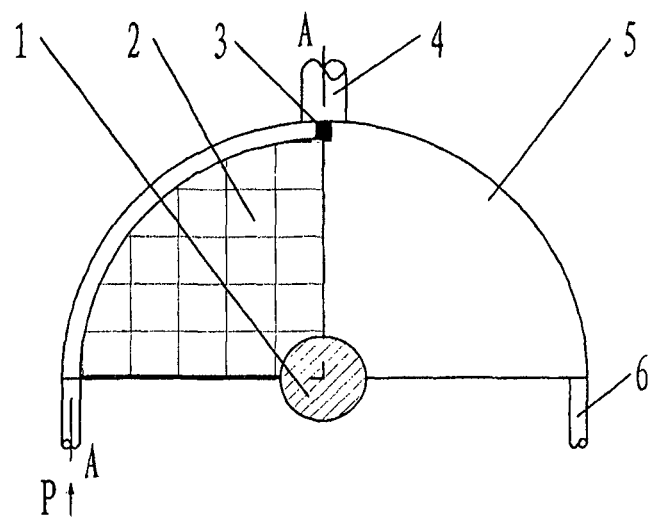
FIG. 1 is a perspective view of a device for obtaining internal energy from liquid by means of buoyancy according to a preferred embodiment 1 of the present invention.
Figure 2:
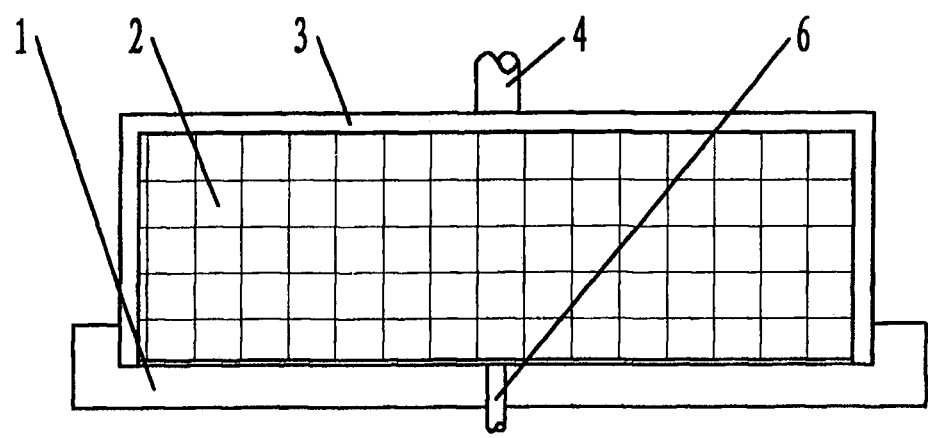
FIG. 2 is an A-A sectional view of FIG. 1 according to the preferred embodiment 1 of the present invention.

Referring to FIG. 1 of the drawings, a device for obtaining energy according to a preferred embodiment 1 of the present invention is illustrated, comprising: an inner body 2; a sealing strip 3; a shell body 5; an axle 1 and liquid, wherein a first side of the sealing strip 3 is integrated with the shell body 5, a second side of the sealing strip 3 couples with the inner body 2 and is capable of moving respectively, a liquid entrance 6 is provided at a bottom portion the shell body 5, the liquid entrance 6 is also a liquid exit, the inner body 2 is connected to the axle 1, an energy transformer is connected to the axle 1.

The inner body 2 is embodied as a ¼ cylinder barrel connected to the axle 1 at a center thereof.

The shell body 5 is embodied as a ½ cylinder barrel, the sealing strip 3 is connected to a position dividing the shell body 5 into two equal halves, a first half of the shell body 5 is embodied as a sealed liquid room, a second half of the shell body 5 is embodied as a gas communicating room, a liquid entrance 6 is provided respectively at a lower portion of the sealed liquid room and the gas communicating room, a gas outlet tube 4 is provided at an upper portion of the shell body 5, the inner body 2 is set to the liquid room and the liquid room is full of the liquid, a density of the inner body 2 equals to a density of the liquid.

The sealing strip 3 is an assembly provided between the inner body 2 and the shell body 5 in a shape combining round shape and bar shape, the sealing strip 3 seals the inner body 2 and the axle 1 from the shell body 5.

The energy transformer is embodied as a device capable of storing the mechanical energy produced by the inner body 2 and outputting the mechanical energy in mechanical energy form, the energy transformer has a structure of an energy storing cylinder.

The preferred embodiment 1 of the present invention also provides a method for obtaining energy, comprising steps of:

a) disposing the inner body 2 inside the shell body 5 and to a first side of the sealed liquid room of the shell body, wherein the inner body 2 is sealed by the sealing strip 3, the density of liquid equals to the density of the inner body 2, a second side of the shell body 5, which is the gas communicating room, communicates with atmosphere through a gas outlet valve, the energy transformer is connected to the axle 1 and exposed to the liquid;

b) pre-storing energy W in the energy transformer, wherein the energy transformer inputs the liquid having a pressure P into the sealed liquid room of the shell body 5 through the liquid entrance by the energy W, the liquid puts a horizontal force F on the inner body 2, the inner body 2 is driven to rotate towards the gas communication room of the shell body 5 by the horizontal force F of the liquid, a weight of the inner body does a work Wg under gravity after being free from buoyancy of the liquid, which means that the work is done in a rotation form in a gravity field, the axle spins with the inner body, a work doing progress is finished after the inner body rotates from the sealed liquid room to the gas communicating room, wherein a work Wp done by the inner body outwardly and the work Wg is inputted into the energy transformer;

c) releasing the liquid in the sealed liquid room via the liquid entrance after the liquid finishes doing work to the inner body, wherein energy Wl is obtained and inputted into the energy transformer when the liquid is released, and the sealed liquid room changes into a new gas communicating room, the energy transformer restores energy Wg+(Wp+Wl) =W+Wg; and d) closing the sealed liquid room for forming the new gas communicating room, and opening the gas communicating room for forming a new sealed liquid room, transmitting the energy W from the energy transformer to the liquid for inputting the liquid into the new sealed liquid room for doing work to the inner body in the sealed liquid room, wherein the inner body spins by gravity after returning into the gravity field and obtains another energy Wg again, repeating steps b), c) and d) again and circularly, wherein: P refers to pressure; Wg refers to energy produced by the weight of the inner body; Wp refers to energy produced by the liquid driving the inner body; Wl refers to energy produced by releasing the liquid.

The energy transformer is embodied as a device capable of storing the mechanical energy produced by the inner body 2 and outputting the mechanical energy in mechanical energy form.

The inner body 2 floating in the liquid is driven to rotate towards the gas communicating room (gravity field) by a force produced by pressure of the liquid. By changing ways of liquid inputting and releasing, a position of the inner body 2 is changed for keeping the inner body 2 in a weightlessness state. Extra energy is obtained continuously by repeating the progress above and is transmitted in mechanical energy form.

Force analysis of the inner body 5: F refers to a horizontal force Fx=P0+pghcAx caused by the pressure P of the liquid; buoyancy may be not considered because the density of the inner body 2 equals to the density of the liquid and the liquid does no work to the inner body 2.

According to the force analysis, the horizontal force F upon the inner body 2 directs from the first sealed room to the second sealed room horizontally, value of the horizontal force F equals to value of horizontally resolved force of the buoyancy, the horizontal force F drives the inner body 2 to rotate from a first sealed room to a second sealed room. The inner body 2 rotates from the first sealed room, which is the liquid room, to the second sealed room, which is the gas communicating room, and does work by means of being driven by the force F, wherein a direction and a value of the force F does not change during rotation. The inner body 2 is driven to rotate by two force because of a weight of the inner body 2. The pressure of the liquid produces the energy Wp and the weight of the inner body 2 produces the energy Wg.

Energy loss of the liquid: a rotation motion of the inner body 2 is actually a piston motion, a theory of the rotation motion is the same as the one of a hydraulic cylinder. When the density of the inner body 2 equals to the density of the liquid, the inner body 2 does no work to the liquid, and vice versa, the liquid does no work to the inner body 2. According to the law of conservation of energy, the energy loss of the liquid equals to the work Wp done to the inner body 2 by the liquid.

It is supposed that the pressure of the liquid is P and a height of the inner body 2 is R, wherein P=R, the density of the inner body 2 and the density of the liquid are 1, and a volume of the inner body 2 is V, energy obtained by liquid: W=RV, wherein a value of W equals to a value the weight of G of the inner body 2;

energy remaining in the liquid: Wl=½RV;

energy loss: Ws=W−Wl=½RV;

work done to the inner body 2 by the force: Wp=R−0/2V=½RV, wherein R−0/2 is a value of average pressure;

work done by the gravity: Wg;

W=Wl+Ws=Wl+Wp, which means that the total amount of energy of the liquid remains constant;

Wg is the extra energy, Wg remains constant and is influenced by the weight of the inner body 2 instead of the pressure of the liquid.

Illustration above means that the liquid does no work to the inner body 2 against the gravity, Wg is produced by gravity instead of the liquid. Reductio ad absurdum can be used for proving this: the inner body 2 can not go back to the liquid only by the energy Wp produced by the liquid because a work should be done against the weight of the inner body 2, so the energy Wg must be involved for remaining the total amount of energy constant.

These also mean the energy Wg can not be obtained only by driving the inner body 2 to return to the liquid, only by utilizing the feature that the total amount of energy of liquid can be remain constant and releasing the liquid can the energy Wg be obtained. And the energy Wg can be obtained continuously by inputting the liquid into the first sealed room and the second sealed room alternately and circularly because the energy Wg is produced during the rotation from the weightlessness state to the gravity field by an extra gravity acceleration g.

According to the law of conservation of energy, no energy can be produced without transforming energy in another form, energy can only be transformed from one form to another form. When an immersed object moves up and down in water, it does no work to an outer system. This means that the total amount of energy in this system remains constant in such progress. The water displaced by the object will move up and down relatively and potential energy of the water is changing at the same time, which means the change of internal energy of the water. And the movement of the object is presented in the extra energy form without doing work to the outer system. This is some kind similar to electronics' energy exchange between kinetic energy and potential energy.

The extra energy of the water displaced can be obtained by taking advantage of a feature that the gravity is a vertically downward conservative force, buoyancy is a vertically upward conservative force and thus the object suffers a weightlessness by means of the gravity and the buoyancy. In addition, two requirements must be accomplished: a) transforming the water displaced by the object (having the internal energy) into a solid form for transmitting the mechanical energy easily; b) transforming the object into the water in such a manner that the total amount of energy in this system remains constant, which means that the liquid displaced by the object does work independently while the buoyancy of the liquid does work to the object, wherein a value of the work done by the liquid displaced by the object equals to a value of the work done by the buoyancy of the liquid, and a direction of the work done by the liquid displaced by the object is opposite to a moving direction of the object.

Figure 3:
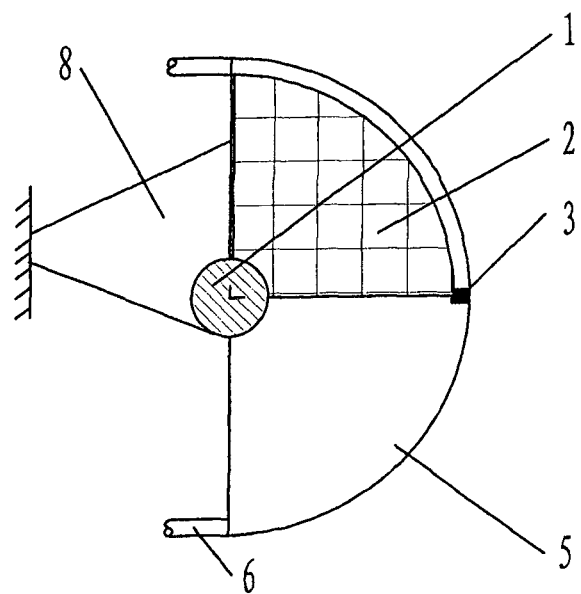
FIG. 3 is a perspective view of a device for obtaining internal energy from liquid by utilizing buoyancy and features of doing work according to a preferred embodiment 2 of the present invention.
Figure 4:
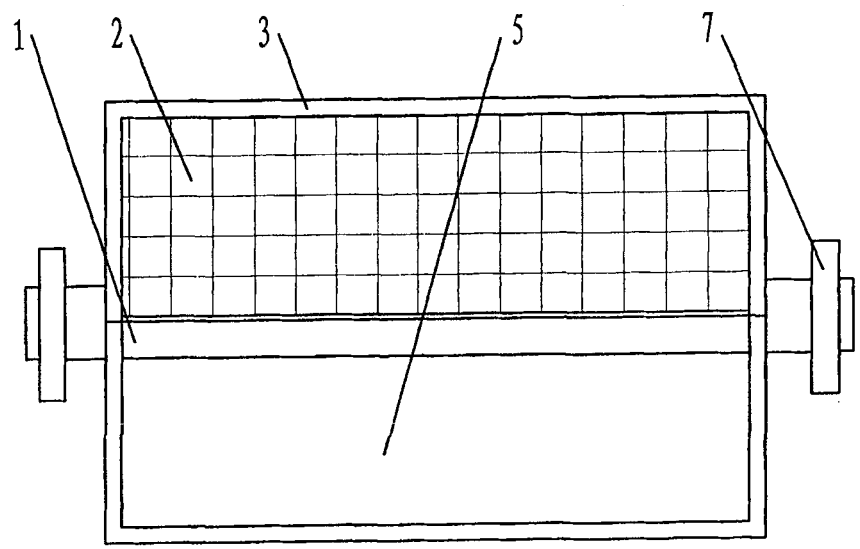
FIG. 4 is a side view of the device for obtaining internal energy from liquid by means of buoyancy according to the preferred embodiment 2 of the present invention.

Referring to FIG. 3 and FIG. 4 of the drawings, a device for obtaining energy according to a preferred embodiment 2 of the present invention is illustrated, comprising: an axle 1, a shell body 5, an inner body 2, a sealing strip 3, a sealing striping holder 8, a bearing holder 7 and liquid, wherein the sealing strip 3 is connected and integrated with the sealing striping holder 8, the inner body 2 is integrated with the axle 1 and is capable of rotating with the axle 1 synchronously, the sealing strip 3 couples with the inner body 2 and the shell body 5 and is capable of moving respectively, an energy transformer is connected to the axle 1 and the shell body 5.

The shell body 5 is embodied as a cube barrel; the energy transformer is embodied as a generating mechanism; a density of the inner body 5 is higher than a density of the liquid.

The preferred embodiment 2 of the present invention also provides a method for obtaining energy, comprising steps of:

a) filling the shell body 5 with the liquid and pre-storing a energy W in the energy transformer;

b) transmitting the energy W to the shell body 5 for rotating the shell body 5 to be synchronous with the inner body 2 in such a manner that a level of the liquid remains because a cambered surface of the inner body 2 is driven to rotate towards a gravity field by liquid pressure and thus the level of the liquid has a trend to drop, wherein energy of a work done by the inner body 2 during rotating is inputted into the energy transformer via the axle 1; and c) rotating the shell body 5 and the inner body 2 backwardly to an original state, wherein a work done by the inner body 2 is counteracted to zero, and energy of a work done by the shell body 5 is inputted into the energy transformer.

Theory of the preferred embodiment 2 is that: inputting the liquid to a sealed liquid room in an upper portion of the shell body 5, and the inner body 2 is driven to rotate towards a gravity field by liquid pressure. The shell body 5 must be rotated for being synchronous with the inner body 2 in such a manner that the level of the liquid remains. The shell body 5 is separated from the inner body 2 by the sealing strip 3 with the sealing strip holder 8 in such a manner that the shell body 5 and the inner body 2 can rotate independently, and an equivalent gravity force per weight of the inner body 2 increases and the liquid pressure upon the inner body 2 remains when the inner body 2 rotates out of the sealing strip 3, so the inner body 2 is driven by both the gravity and the pressure to do work. The sealing strip 3 is immovably held by the sealing strip 8 in such a manner that the level of the liquid remains and the inner body 2 and the shell body 5 are sealed. The device can return to the original state by rotating the shell body 5 before rotating the inner body 2 as well as rotating the shell body 5 and the inner body 2 synchronously. Others not mentioned are the same as the preferred embodiment 1.

Figure 5:
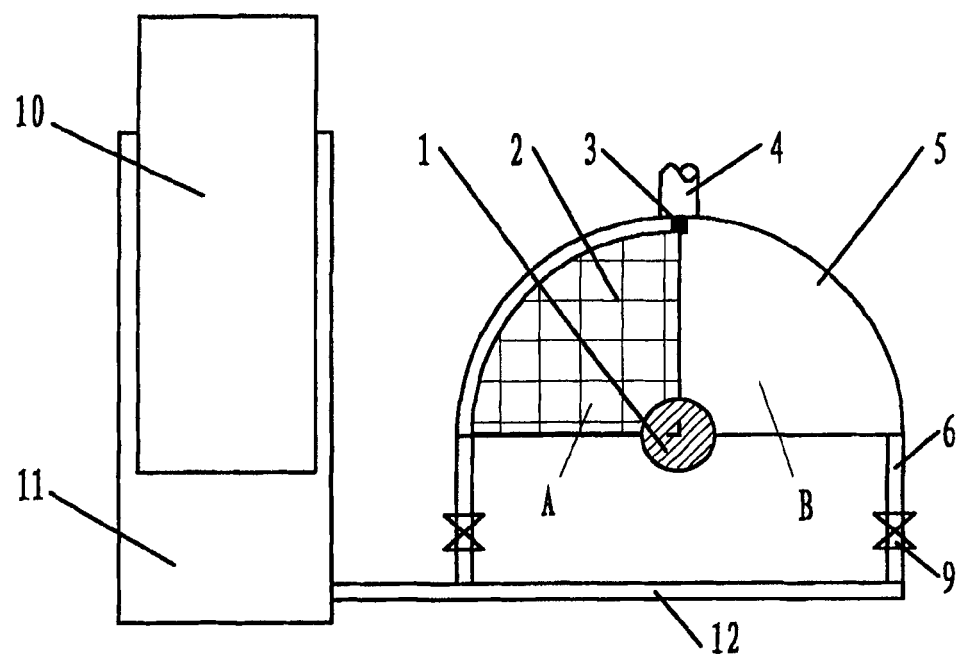
FIG. 5 is a perspective view of a device for obtaining internal energy from liquid by means of buoyancy according to a preferred embodiment 3 of the present invention.

Referring to FIG. 5 of the drawings, a device for obtaining internal energy from liquid by utilizing buoyancy and features of doing work according to a preferred embodiment 2 of the present invention is illustrated, comprising: a floating barrel 11, a floating body 10, a communicating tube 12, a valve 9, wherein the floating barrel 11 with cylinder shape is provided on a first side of the device, a top of the floating barrel 11 communicates with atmosphere, the floating body 10 is provided in the floating barrel 11; the shell body 5 is provided on a second side of the device, the inner body 2, which is embodied as a ¼ cylinder barrel, is provided in the shell body 5, the inner body is connected to the axle at a center thereof, the communicating tube 12 is provided at a bottom portion of the inner body 2 for communicating with a left liquid entrance and a right liquid entrance provided at a bottom portion of the shell body 5, the left valve 9 is mounted inside the left liquid entrance as well as the right valve 9 is mounted inside the right liquid entrance, the left liquid entrance and the right liquid entrance are also liquid exits.

The shell body 5 is embodied as a cube barrel; the energy transformer is embodied as a spring mechanism; a density of the inner body 5 is lower than a density of the liquid.

The preferred embodiment 3 of the present invention also provides a method for obtaining energy, comprising steps of:

a) opening the left valve 9 and closing the right valve 9 in such a manner that the floating body 11 moves down for driving liquid in the floating barrel 10 into a sealed liquid room A, wherein the inner body 2 does a work when the inner body 2 is driven to rotate towards a gas communicating room B;

b) driving the liquid to return to the floating barrel 10 and feeding energy obtained by the floating body 11 back to the liquid or the inner body 2 in such a manner that the total amount of energy of the liquid remains constant; and c) closing the left valve 9 and opening the right valve 9 for doing work to the liquid in the air communicating room B, wherein other parts not mentioned are the same as the steps above, energy can be obtained by changing position state of the inner body 2 continuously and circularly.

Theory of the preferred embodiment 2: the preferred embodiment 3 is a method for providing the pressure P in the liquid of the preferred embodiment 1, the floating body 11 moves down for driving liquid in the floating barrel 10 into a sealed liquid room, the buoyancy upon the inner body 2 changes from 1F to 2F, the inner body rotates into the gas communicating room when the sealed liquid room is filled with the liquid, the buoyancy upon the inner body 2 changes from 2F to zero when the liquid returns from the sealed liquid room to the floating barrel 12, the preferred embodiment 3 is for illustrating that volume of the inner body 2 lifted by the liquid equals to volume of the liquid displaced by the inner body during moving up. If the floating body 11 is change by a piston, the theory is still adaptable. Others not mentioned are the same as the preferred embodiment 1.

A preferred embodiment 4: the energy transformer is a lifting pump.

Others not mentioned are the same as the preferred embodiment 1.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A device for obtaining internal energy from liquid by utilizing buoyancy and features of doing work, comprising: an inner body; a sealing strip; a shell body; an axle and liquid, wherein said sealing strip is mounted between said shell body and said inner body, a liquid entrance is provided at a bottom portion said shell body, said inner body is connected to said axle, an energy transformer is connected to said axle or said shell body.

2. The device for obtaining internal energy from liquid by utilizing buoyancy and features of doing work, as recited in claim 1, wherein said inner body is a ¼ cylinder barrel connected to said axle at a center thereof.

3. The device for obtaining internal energy from liquid by utilizing buoyancy and features of doing work, as recited in claim 1, wherein said shell body is a ½ cylinder barrel, a cube barrel or a cuboid barrel, said sealing strip is connected to a position dividing said shell body into equal halves, a first half of said shell body is a sealed liquid room, a second half of said shell body is a gas communicating room, a liquid entrance is provided respectively at a bottom portion of said sealed liquid room and said gas communicating room.

4. The device for obtaining internal energy from liquid by utilizing buoyancy and features of doing work, as recited in claim 1, wherein said energy transformer is a device capable of storing the mechanical energy produced by said inner body and outputting the mechanical energy in mechanical energy form, said energy transformer can be a generator, an energy storing cylinder, a lifting pump or a spring mechanism.

5. A method for obtaining internal energy from liquid by utilizing buoyancy and features of doing work, comprising steps of:

a) disposing an inner body inside a shell body and to a first side of a sealed liquid room of the shell body, wherein the inner body is sealed by a sealing strip, a density of liquid equals to a density of the inner body, a second side of the shell body, which is a gas communicating room, communicates with atmosphere;

b) inputting the liquid having a pressure P into the sealed liquid room of the shell body through a liquid entrance, wherein the liquid puts a horizontal force F on the inner body, the inner body is driven to rotate towards the gas communication room of the shell body by the horizontal force F of the liquid, a weight of the inner body does a work Wg under gravity after being free from buoyancy of the liquid, which means that the work is done in a rotation form in a gravity field, an axle spins with the inner body, a work doing progress is finished after the inner body rotates from the sealed liquid room to the gas communicating room, wherein a work Wp done by the inner body to an outer system and the Wg is inputted into an energy transformer;

c) releasing the liquid in the sealed liquid room via the liquid entrance after the liquid finishes doing work to the inner body, wherein energy Wl is obtained when the liquid is released, and the sealed liquid room changes into a new gas communicating room, the energy Wp is fed back through the energy transformer to the liquid released for obtain energy Wl+Wp=W to restore energy of the liquid, an energy loss of the liquid is paid back by the energy Wp, the energy of the liquid remains constant; and d) closing the sealed liquid room for forming the new gas communicating room and opening the gas communicating room for forming a new sealed liquid room, inputting the liquid, which has restored the energy, into the new sealed liquid room for doing work to the inner body in the sealed liquid room, wherein the inner body rotates by gravity after returning into the gravity field and obtains another energy Wg again, repeating steps above again and circularly.

6. An energy transmitting device, comprising:

a shell body having an inner space, a first liquid entrance and a second liquid entrance mounted at a bottom portion of said shell body, wherein liquid is inputted or outputted through said first liquid entrance and said second liquid entrance, an axle mounted inside said inner space and capable of communicating with an outer system, wherein the outer system is driven by said axle when said axle rotates, an inner body provided inside said inner body, wherein a bottom portion of said inner body is connected to said axle and is capable of rotating with said axle synchronously when driving by the liquid or a weight of said inner body, a sealing device mounted between said shell body and said inner body for dividing said inner space into a first room and a second room, wherein when said inner body rotates, the liquid in said first room does not flow into said second room, and vice versa, the liquid in said second room does not flow into said first room, a pump driving by an outer power resource, comprising a first communicating tube and a second communicating tube connected to said first liquid entrance and said second liquid entrance respectively, wherein said pump is capable of driving the liquid into said shell body, a first valve and a second valve mounted in said first communicating tube and said second communicating tube respectively, wherein said pump is capable of driving said first valve and said second valve to open or close for determining that the liquid is inputted into said first room or said second room, and a barrel connected to said pump for storing the liquid, wherein when said inner body is in said first room, said pump drives said first valve to open and said second valve to close for driving the liquid in said barrel into said first room, said inner body is driven to rotate by a pressure of the liquid and then by said weight of said inner body as well as the pressure of the liquid for rotating into said second room, said pump stops after said inner body rotates into said second room and the liquid returns to said barrel, said pump works again and drives said first valve to close and said second valve to open for driving the liquid in said barrel into said second room, said inner body is driven to rotate by the pressure of the liquid and then by said weight of said inner body as well as the pressure of the liquid for rotating into said first room, said pump stops after said inner body rotates into said first room and the liquid returns to said barrel, repeating progresses above again and circularly in such a manner that the outer system is driven by said axle.

7. The energy transmitting device, as recited in claim 6, wherein said sealing device is connected to a position dividing said shell body into equal halves.

* * * * *